March 14, 1950
F. KESSLER
2,500,289
TELEPHONE PULSE REPEATER
ACTUATED BY BREAK PERIOD
Filed Aug. 30, 1946
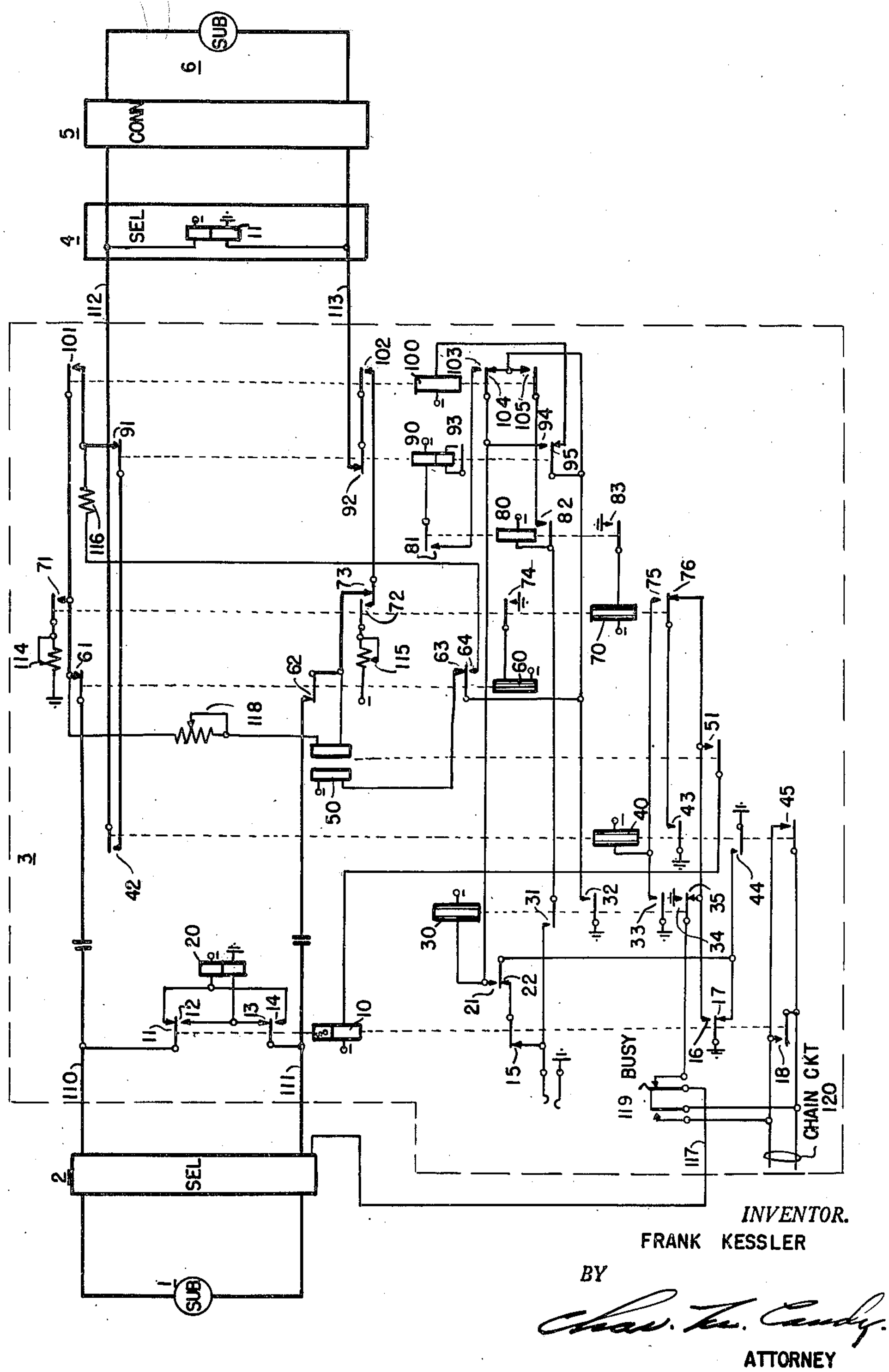
INVENTOR.
FRANK KESSLER
BY
Chas. W. Candy
ATTORNEY Patented Mar. 14, 1950

2,500,289

UNITED STATES PATENT OFFICE 2,500,289

TELEPHONE PULSE REPEATER ACTUATED BY BREAK PERIOD

Frank Kessler, Lombard, Ill., assignor to Automatic Electric Laboratories, Inc., Chicago, Ill., a corporation of Delaware Application August 30, 1946, Serial No. 694,043

4 Claims. (Cl. 179—16)

The invention relates in general to automatic telephone systems, and more particularly, to a novel circuit arrangement for an impulse correcting repeater.

The main object of the invention is to provide an impulse repeater circuit arrangement whereby correction of impulse transmission may be accurately and efficiently accomplished.

The impulse repeater disclosed herein is of the type which is arranged to repeat a corrected impulse only after the corresponding incoming impulse has been terminated, the open interval of the corrected impulse being independent of the duration of the open interval of the incoming impulse. The present invention is in the nature of an improvement on the impulse repeater disclosed in the Lomax-Jones application Serial #666,283, now Patent Number 2,487,252, granted November 8, 1949, filed May 1, 1946.

A feature of this invention is the manner in which a relay in the repeater is arranged to operate responsive to seizure of the repeater to close the repeater outgoing circuit, the same relay being further operated to determine the duration of the break of the corrected impulse transmitted over the circuit by the repeater.

A further feature of the invention provides for energization of a relay, for the purpose of controlling a pair of relays to transmit corrected impulses in the manner described above, on the break period of the initial impulse and to be energized subsequently on each successive break.

Another feature of the invention is the provision of means in an impulse repeater of this type for quickly releasing the equipment which seized the repeater on release of the repeater line relay and then in a subsequent operation providing protection for the repeater against seizure by other automatic switches over the incoming side until the equipment on the called side of the repeater has released.

A further feature of the invention is the provision of means in the repeater for completing a preenergizing circuit over the trunk line to a distant associated automatic switch during the break period of each corrected impulse.

The invention, both as to its organization and method of operation, together with further objects and advantages thereof, will best be understood by reference to the following specification and the accompanying drawing.

Referring now to the drawing, the automatic telephone system there illustrated comprises a subscriber substation 1, a group of automatic switches including selector switch 2, repeater circuit 3, selector switch 4, connector switch 5, and subscriber substation 6. The selectors and connectors in the system are of the conventional Strowger type.

The repeater circuit, as illustrated, comprises a relay group including a reverse battery relay 10, a line relay 20, hold relays 30 and 40, polarized relay 50, hold relays 60 and 70, trigger relay 80, and timing relays 90 and 100, resistances 114, 115, 116, 118, busy key 119, and a control network connected and arranged in a manner more fully described hereinafter. The substations shown are of the conventional automatic type comprising a telephone instrument, impulse sender and ringer.

Considering now the extension of a call from subscriber substation 1 to subscriber substation 6. The call is initiated in the usual manner when the subscriber removes the receiver at substation 1. The calling subscriber then dials the coded number assigned to substation 6 whereby selector 2 will be operated to seek an idle repeater circuit. Assuming the repeater circuit 3 illustrated in the drawing is idle and is the circuit selected by the selector 2, line relay 20 in the repeater circuit will be energized over incoming lines 110, 111 and contacts 11 and 13. Relay 20 operates and at its contacts 21 completes a circuit to hold relay 30. Relay 30 operates and at its contacts 31 prepares a point in the circuit for relay 80, at its contacts 32 completes a circuit to the first winding of polarized relay 50 over contacts 63 and also completes a circuit to relay 100 over contacts 95, at its contacts 33 completes a circuit to relay 40, and at its contacts 34 places ground on the incoming C lead 117 thereby rendering the repeater busy to seizure attempts by associated selectors. Relay 100 operates and at its contacts 101 and 102 prepares a bridge circuit to selector 4, at its contacts 103 prepares a point in the circuit for relay 90, at its contacts 104 breaks the holding circuit for relay 30 which existed over contacts 32 and 104, and at its contacts 105 prepares a point in a holding circuit for relay 80 to extend over contacts 82 and 32. Relay 40 operates at the same time and at its contacts 42 connects the selector 2 to selector 4 through the repeater and also completes the bridge circuit which extends over conductor 112, contacts 42, 91, 101, resistance 118, the second winding of polarized relay 50, contacts 73, 102, 92 and conductor 113 to energize the line relay in selector 4. Relay 50 is a shunt field polarized relay of the type disclosed in the patent to Erickson, No. 1,544,300, granted June 30, 1925. The windings of relay 50 at this time are energized differentially and the relay is therefore ineffective to operate. Relay 40 at its contacts 43 prepares a circuit having no function at this time, at its contacts 44 completes a holding circuit over contacts 21 to relay 30, and at its contacts 45 completes a point in chain circuit 120.

When the calling subscriber dials, the calling line loop is interrupted a number of times corresponding to the value of the digit and as a result, the line relay 20 is de-energized a number of times to produce in combination with the associated repeater circuit a like number of interceptions in line conductors 112 and 113, the outgoing interruptions being of a certain time length regardless of the duration of the break period of the incoming impulses. Each interruption is repeated only after the corresponding incoming interruption has been terminated. This repeating operation will now be described. On the first incoming interruption relay 20 releases and at its contacts 21 breaks the original operating circuit to relay 30, which being slow to release remains operated, and at its contacts 22 completes a circuit to trigger relay 80 over contacts 17, 22, 15 and 31. Trigger relay 80 operates and at its contact 81 prepares a circuit for relay 90, at its contacts 82 completes a self-holding circuit over contacts 82, 105 and 32, and at its contacts 83 completes an operating circuit to relay 70. Relay 70 operates and at its contacts 71 and 72 completes the battery pulsing loop which passes over outgoing conductor 112 and 113 and resistances 114 and 115. These resistances may be adjusted to provide the proper values suitable for either a battery pulsing or a loop pulsing arrangement. Relay 70 also, at its contacts 73, breaks a point in the holding bridge circuit described heretofore, opens the circuit of the second winding of relay 50, and connects battery over conductor 113 to the line relay in selector 4, at its contacts 74 completes a circuit for relay 60, at its contact 75 completes a holding circuit for relay 40 over contacts 43 and 75, and at its contacts 76 breaks a circuit not having a function at this time. Relay 60 operates and at its contact 61 breaks the connection between incoming conductor 110 and outgoing conductor 112, at its contacts 62 breaks the connection between incoming conductor 111 and outgoing conductor 113, at its contacts 63 breaks the circuit to the first winding of relay 50, and at its contacts 64 connects an adjustable secondary ground to the outgoing conductor 112 which is effective to cause the line relay in selector 4 to act more quickly on receipt of the make period of each outgoing impulse.

Line relay 20 now operates responsive to the first make after the first break of the received impulses. Relay 20, at its contacts 21, completes a circuit over contacts 17, 21, 103, 81 to relay 90, at its contacts 22 breaks the operating circuit to relay 80 which holds over contacts 82, 105, and 32. Relay 90 operates and at its contacts 91 opens a point in the outgoing circuit over conductor 112 to selector 4 and removes resistance 116 from the outgoing line to allow quick release of the line relay in the selector, at its contacts 92 opens a point in the outgoing circuit to selector 4 over conductor 113, at its contacts 93 short circuits its own winding thereby making it slow to release, at its contacts 94 completes a self-holding circuit over contacts 32, 94, 103 and 81, and at its contacts 95 opens the operating circuit to relay 100. Relay 100 releases and at its contacts 101 and 102 opens further points in the outgoing circuit to selector 4, at contacts 103 opens the operating circuit to relay 90, at contacts 104 closes a holding circuit to relay 30 over contacts 104 and 32, and at contacts 105 opens the holding circuit to relay 80. Inasmuch as relay 90 is short circuited, its release time will be of longer duration than relay 80. Relay 80 releases and at its contacts 81 opens a further point in the circuit to relay 90, at its contacts 82 opens a further point in its holding circuit, at its contacts 83 opens the operating circuit to relay 70. Relay 70 is slow to release and will therefore hold for the duration of impulses, being aided during each break period of the incoming impulses by energization of relay 80. Relay 90 releases and at its contacts 91 and 92 close a point in the outgoing circuit to selector 4, and inserts resistance 116 in series with the line, at its contacts 93 opens its own short circuit, at its contacts 94 opens a further point in its self-holding circuit and breaks the holding circuit to relay 30 extending from ground over contacts 32 and 94, and at contacts 95 completes an operating circuit to relay 100. Relay 30 remains energized over contacts 17 and 21. Relay 100 operates and at its contacts 101 and 102 closes the circuit over conductors 112 and 113 to selector 4, at its contact 103 closes a point in the circuit to relay 90, at its contacts 104 opens the holding circuit to relay 30 over contacts 32 and 104, and at contacts 105 prepares a holding circuit for relay 80. The outgoing interruption was transmitted therefore, only after the corresponding incoming impulse was completed. The length of the outgoing interruption, as noted in the above description, was determined by the release time of relay 90, plus the release time and the operate time of relay 100, the length of the outgoing interruption therefore being determined independent of the incoming impulse duration. The repeater circuit is operative to repeat the dialed digits as narrated previously herein, and is effective thereby to complete the connection to the desired subscriber 6. A short interval after the digit group is transmitted relays 60 and 70 deenergized. Relay 70 releases and at its contacts 71 and 72 removes the battery pulsing loop from the line and prepares a point in the connection through the repeater, at its contacts 74 opens the operating circuit to relay 60 and at its contacts 76 prepares a point in the circuit to relay 10. Relay 60 releases and at its contacts 61 and 62 completes the subscriber connection through the repeater to the called subscriber, at its contacts 63 completes an operating circuit to the first winding of relay 50 over contacts 32, and at its contacts 64 removes the resistance 116 from the line circuit. Relays 20, 30, 40 and 100 remain in the operated condition and the connection is now extended from subscriber 1 over selector 2, the incoming conductors 110, 111 of repeater circuit 3, contacts 61, and 62, 73, 101 and 102, 91 and 92, 42, conductors 112 and 113 of the repeater, selector 4, connector 5, to subscriber 6.

When the called subscriber answers, the connector 5 in use reverses the direction of current flow over the conductors 112 and 113, causing the energization of the second winding of relay 50. Relay 50 operates and at its contacts 51 completes a circuit to relay 10 over contacts 43 and 76. Relay 10 operates and at its contacts 12 and 14 reverses the direction of current flow in the calling subscribers line. Relays 10, 20, 30, 40, 50 and 100 are now operated.

When the calling subscriber restores his receiver, relay 20 deenergizes and at its contacts 21 breaks the operating circuit to relay 30, and at its contact 22 closes a point in the circuit to relay 80. After an interval, relay 30 releases and at its contacts 31 opens a further point in the circuit to relay 80, at its contacts 32 opens the circuit to relays 100 and 50, at its contacts 33 opens the operating circuit to relay 40, at its contacts 34 momentarily removes ground from the conductor 117 to provide time for release of previous switches, and at its contacts 35 reconnects ground to the conductor 117 over contacts 43 and 76 to provide sufficient time for the subsequent switches to release before seizure by a second subscriber. Relay 50 releases and at its contacts 51 opens the operating circuit to relay 10. Relays 10 and 100 release. Relay 40 after a short interval releases and further opens the trunk circuit at its contacts 42, at its contacts 45 opens the chain circuit, and at its contacts 43 removes ground from C lead 117 to allow the repeater to be seized for subsequent connections.

If the called subscriber hangs up first, relay 50 releases and at its contacts 51 releases relay 10. The set is restored to normal as before when the calling subscriber restores his receiver.

While particular embodiments of the invention have been illustrated, it is to be understood that numerous modifications in the details of arrangement may be resorted to without departing from the true spirit and scope of the invention as defined in the appended claims.

What is claimed is:

1. In combination with a trunk line over which impulses are transmitted, each of said impulses having a make and break period, the ratio of said make to break periods being different at different times, and impulse correcting repeater having incoming and outgoing connections connected to said trunk line, a selector having a line relay connected by a section of said trunk line to the outgoing connections of said repeater, means in said repeater responsive to each of said incoming impulses to transmit a corresponding corrected impulse to said selector only upon termination of such incoming impulse, said means operative to cause each of said corrected impulses to have a predetermined break interval independent of the make to break ratio of said incoming impulses, said means operated to insert a resistance in said connection to said selector during the latter portion of each break period of the corrected impulses for the purpose of preenergizing the line relay in said selector, and operated to remove said resistance from said connection during the initial portion of each break period of the corrected impulses.

2. In combination with a trunk line arranged to receive impulses, said impulses having different break intervals at different times, an impulse repeater having its incoming and outgoing conductors connected to said line, a group of automatic switches connected to said incoming conductors over said line, another group of automatic switches connected to said outgoing conductors over said line, means in said repeater operative on seizure by one of the switches of said first group to transmit corrected impulses over said outgoing line to the other of said group of switches only upon termination of the corresponding incoming impulse, said corrected impulse having a break period of predetermined length independent of the break interval of the incoming impulses, said means operated on seizure of said repeater by a switch of said first group to busy the repeater circuit to other switches of said first group, said means operated on release of the connection to said repeater to remove the busy connection to said first group to permit release thereof and further operated to apply a second busy connection to said first group to prevent seizure of the repeater thereby before release of said second group of switches.

3. An impulse correcting repeater, incoming and outgoing connections for said repeater, means for seizing said repeater over said incoming connections, a line relay in said repeater energized by the seizure of said repeater and deenergized and reenergized by impulses transmitted over said incoming connections, said impulses having make and break periods of varying ratio, a first and second pulsing relay in said repeater, a first circuit including make contacts on said line relay and back contacts on said first and second pulsing relays completed by the energization of said line relay for initially energizing said first pulsing relay, a second circuit including back contacts on said second pulsing relay for subsequently energizing said first pulsing relay independent of said line relay make contacts and independent of said back contacts on said first pulsing relay after the initial energization of said first pulsing relay, an operating circuit for said second pulsing relay, normally open contacts on said first pulsing relay included in said second pulsing relay operating circuit and closed responsive to the operation of said first pulsing relay to prepare said operating circuit of said second pulsing relay, means including said make contacts on said line relay and said normally open contacts on said first pulsing relay completing said second pulsing relay operating circuit each time said line relay is energized during a make period following a break period to energize said second pulsing relay, said back contacts on said second pulsing relay opening said first and second circuits to deenergize said first pulsing relay in response to the energization of said second pulsing relay, said normally open contacts on said first pulsing relay opening the operating circuit of said second pulsing relay to deenergize said second pulsing relay in response to the deenergization of said first pulsing relay, said back contacts on said second pulsing relay reestablishing said second circuit of said first pulsing relay to reenergize said first pulsing relay in response to the deenergization of said second pulsing relay, and pulsing contacts on said first and second pulsing relays included in said outgoing connections for transmitting corrected outgoing impulses having break periods determined solely by the operate time of said first and second pulsing relays.

4. In an impulse correcting repeater, incoming and outgoing connections for said repeater, means for seizing said repeater over said incoming connections, a line relay in said repeater initially energized by the seizure of said repeater and deenergized and reenergized by impulses transmitted over said incoming connections, said incoming impulses having make and break periods of varying ratio, a control relay and first and second pulsing relays in said repeater, a first circuit including make contacts on said line relay and back contacts on both said first and second pulsing relays completed by the energization of said line relay for initially energizing said first pulsing relay, a second circuit including said back contacts on said second pulsing relay for subsequently energizing said first pulsing relay independent of said line relay make contacts and independent of said back contacts on said first pulsing relay after the initial energization of said first pulsing relay, an operating circuit for said second pulsing relay, normally open contacts on said first pulsing relay included in said second pulsing relay operating circuit and closed responsive to the operation of said first pulsing relay to prepare said operating circuit of said second pulsing relay, means for operating said control relay in response to each deenergization of said line relay during the break period of each incoming impulse, make contacts on said control relay and said make contacts on said line and first pulsing relays completing said second pulsing relay operating circuit each time said line relay is energized during a make period following a break period to energize said second pulsing relay, said back contacts on said second pulsing relay opening said first and second circuits to deenergize said first pulsing relay in response to the energization of said second pulsing relay, said normally open contacts on said first pulsing relay opening said operating circuit of said second pulsing relay to deenergize said second pulsing relay in response to the deenergization of said first pulsing relay, said back contacts on said second pulsing relay reestablishing said second circuit to reenergize said first pulsing relay in response to the deenergization of said second pulsing relay, and pulsing contacts on said first and second pulsing relays included in said outgoing connection for transmitting corrected outgoing impulses having break periods determined solely by the operate time of said first and second pulsing relays.

FRANK KESSLER.

REFERENCES CITED

The following references are of record in the file of this patent:

UNITED STATES PATENTS

| Number | Name | Date |
|---|---|---|
| 1,589,409 | Miller | June 22, 1926 |
| 1,747,405 | Beckerath | Feb. 18, 1930 |
| 1,831,730 | Ahlberg | Nov. 10, 1931 |
| 2,061,802 | Kroll et al. | Nov. 24, 1936 |
| 2,428,550 | Burgener | Oct. 7, 1947 |